United States Patent
Berkooz

(10) Patent No.: US 12,007,499 B2
(45) Date of Patent: Jun. 11, 2024

(54) SENSOR CALIBRATION IN ADVANCED DRIVER-ASSISTANCE SYSTEM VERIFICATION

(71) Applicant: ZF FRIEDRICHSHAFEN AG, Friedrichshafen (DE)

(72) Inventor: Gahl Berkooz, Ann Arbor, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1002 days.

(21) Appl. No.: 16/928,221

(22) Filed: Jul. 14, 2020

(65) Prior Publication Data

US 2021/0018589 A1  Jan. 21, 2021

Related U.S. Application Data

(60) Provisional application No. 62/875,209, filed on Jul. 17, 2019.

(51) Int. Cl.
  *G01S 7/40* (2006.01)
  *G06N 3/08* (2023.01)
  (Continued)

(52) U.S. Cl.
  CPC .............. *G01S 7/40* (2013.01); *G06N 3/08* (2013.01); *G06T 7/80* (2017.01); *G06V 10/147* (2022.01);
  (Continued)

(58) Field of Classification Search
  CPC .. G06N 3/08; G06N 3/045; G01S 7/40; G01S 7/4021; G01S 7/4972; G01S 13/931;
  (Continued)

(56) References Cited

U.S. PATENT DOCUMENTS

| 10,723,281 B1* | 7/2020 | Briggs | ............... G01S 7/4972 |
| 2020/0353878 A1* | 11/2020 | Briggs | ............... G01S 17/931 |
| 2022/0210228 A1* | 6/2022 | Campbell | ............... H04L 67/55 |

OTHER PUBLICATIONS

Mazzei, Luca, and et al. "A lasers and cameras calibration procedure for VIAC multi-sensorized vehicles." In 2012 IEEE Intelligent Vehicles Symposium, pp. 548-553. IEEE, 2012 (Year: 2012).*

(Continued)

*Primary Examiner* — Douglas Kay
(74) *Attorney, Agent, or Firm* — TAROLLI, SUNDHEIM, COVELL & TUMMINO L.L.P.

(57) ABSTRACT

Systems and methods are provided for validating a sensor system associated with a vehicle. The vehicle is equipped with a set of replica sensors selected and positioned to emulate an optical path of a master set of sensors that has already been validated. The second vehicle is driven for a distance less than that required for validation of the sensor system to acquire a first set of data associated with the set of replica sensors and a second set of data associated with the sensor system. A machine learning model is trained on the first and second sets of data to provide an image transfer function. The image transfer function is applied to a set of master validation data produced during validation of the master vehicle to produce a set of transformed validation data. The new sensor system is validated with the set of transformed validation data.

19 Claims, 4 Drawing Sheets

(51) Int. Cl.
*G06T 7/80* (2017.01)
*G06V 10/147* (2022.01)
*G06V 20/56* (2022.01)

(52) U.S. Cl.
CPC .... *G06V 20/56* (2022.01); *G06T 2207/20081* (2013.01)

(58) Field of Classification Search
CPC ........ G01S 17/86; G01S 17/89; G01S 17/931; G01S 2013/9323; G06T 7/80; G06T 2207/20081; G06V 10/147; G06V 20/56
See application file for complete search history.

(56) References Cited

OTHER PUBLICATIONS

Foxlin, Eric M. "Generalized architecture for simultaneous localization, auto-calibration, and map-building." In IEEE/RSJ International Conference on Intelligent Robots and Systems, vol. 1, pp. 527-533. IEEE, 2002 (Year: 2002).*

Lüken, Markus, Berno JE Misgeld, Daniel Rüschen, and Steffen Leonhardt. "Multi-sensor calibration of low-cost magnetic, angular rate and gravity systems." Sensors 15, No. 10 (2015): 25919-25936 (Year: 2015).*

Bellino, Mario, Yuri Lopez de Meneses, Sascha Kolski, and Jacques Jacot. Calibration of an embedded camera for driver-assistant systems. IEEE, 2005 (Year: 2005).*

* cited by examiner

SENSOR CALIBRATION IN ADVANCED DRIVER-ASSISTANCE SYSTEM VERIFICATION

RELATED APPLICATIONS

This application claims priority from U.S. Patent Application Ser. No. 62/875,209, filed 17 Jul. 2019 and entitled SENSOR LOCATION AND CALIBRATION IN ADVANCED DRIVER-ASSISTANCE SYSTEM VERIFICATION, which is incorporated herein in its entirety.

TECHNICAL FIELD

This invention relates to advanced driver-assistance systems, and more particularly, to sensor calibration in advanced driver-assistance system verification.

BACKGROUND

To validate the performance of an advanced driver-assistance system (ADAS), an original equipment manufacturer can be required to drive the vehicle for up to a million kilometers. The cost of this validation is on the order of eight EURO per kilometer, representing a significant expense for a manufacture that may have twenty or more programs to be validated in a year. Further, every time there is a change in the sensor or the location of the sensor, the vehicle needs to driven again to validate the ADAS system. A computer can be used to generate photo-realistic scenes that include vehicles, roads, trees, people, atmospheric conditions, and lighting conditions, with this synthetically generated scene as input into a Hardware In the Loop (HIL) ADAS lab bench to simulate the visual input and validate the systems performance. For some applications, however, this method is insufficient because the sensors were not stimulated with "real miles" and there is an unquantifiable doubt regarding whether the system response would be different had it been stimulated with "real miles."

SUMMARY

In accordance with a first example, a system is provided for validating a sensor system associated with a first vehicle. The system includes the sensor system associated with the first vehicle and a replica sensor system configured to emulate an optical path of a master sensor system associated with a second vehicle. The master sensor system has an associated set of validation data. A validation data generator is configured to generate a transfer function between a set of images taken at the sensor system associated with the first vehicle and a set of images taken at the replica sensor system and apply the transfer function to the set of validation data associated with the master sensor system to provide a set of validation data for the sensor system associated with the first vehicle.

In accordance with a second example, a method is provided for validating a sensor system associated with a vehicle. The vehicle is equipped with a set of replica sensors selected and positioned to emulate an optical path of a master set of sensors, associated with a master vehicle that has already been validated. The second vehicle is driven for a distance less than that required for validation of the sensor system to acquire a first set of data associated with the set of replica sensors and a second set of data associated with the sensor system. A machine learning model is trained on the first set of data and the second set of data to provide an image transfer function. The image transfer function is applied to a set of master validation data produced during validation of the master vehicle to produce a set of transformed validation data. The new sensor system is validated with the set of transformed validation data.

In accordance with a third example, a method is provided for validating a sensor system associated with a vehicle. The vehicle is equipped with a set of replica sensors selected and positioned to emulate an optical path of a master set of sensors, associated with a master vehicle that has already been validated. The second vehicle is driven for a distance less than that required for validation of the sensor system to acquire a first set of data associated with the set of replica sensors and a second set of data associated with the sensor system. A convolutional neural network is trained on the first set of data and the second set of data to provide an image transfer function. Each of a set of images comprising a set of master validation data is provided to the convolutional neural network to produce a set of transformed images, and the new sensor system is validated with the set of transformed images.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
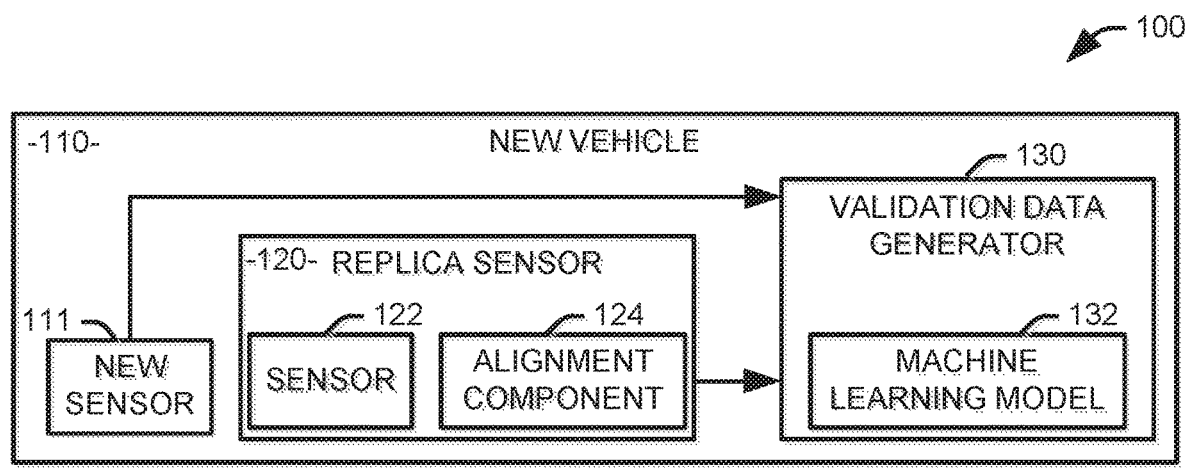
FIG. 1 illustrates one example of a system for providing validation data for an ADAS system.

In the context of the present disclosure, the singular forms "a," "an" and "the" can also include the plural forms, unless the context clearly indicates otherwise. The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "model" can refer to a representation of an object created on a computer. In some instances, the model can be a three-dimensional representation of the object, either as data stored on a non-transitory computer readable medium or media or a physical object, for example, produced via a rapid prototyping process.

The term "sensor" can refer to a device configured to produce an image based on received electromagnetic radiation. A sensor can operate solely on ambient radiation or can include a transmitter that projects electromagnetic radiation into a region of interest to facilities imaging. Examples of sensors can include cameras operating in the visible light and infrared range as well as radar and lidar systems.

As used herein, the term "substantially identical" refers to articles or metrics that are identical other than manufacturing or calibration tolerances.

The term "coordinate system" can refer to a system of representing points in a space of given dimensions by coordinates.

Given the expense of validating new vehicles and sensor systems, the systems and methods provided herein provide a method that allows a reduction in the miles driven for advanced driver-assistance system (ADAS) validation. Specifically, new vehicles can be outfitted with replica sensors intended to mimic the performance of sensors from an already validated vehicle and driven a shorter distance. Data from the new sensor and the replica sensors from shorter ride to create a transformation that can transform previously collected sensor outputs to be "as viewed" by the new sensors. The replica sensors can be selected and positioned such that the transformed sensor output is substantially identical to what the new sensor would have output had it been driven on the vehicle that was used to collect the signals that were transformed. The position of the replica sensors on the vehicle that is driven with the new sensors can be adjusted to provide that the sensing path to the new sensors that are part of the validation objective is identical to the sensing path in the previously collected sensor data. In summary, the replica sensors are selected to be identical to the sensors used to collect the validation information for the master vehicle and are movable on the vehicle that is used to collect the new sensor information. This allows the sensing path of the replica sensors to be aligned and calibrated, and signals from the replica sensors can be used to create and or validate a transformation from the previously collected validation data to the new sensor data.

FIG. 1 illustrates one example of a system 100 for providing validation data for an ADAS system. The system 100 for training a new sensor system 111 for a new vehicle 110 includes a replica sensor system 120 carried on the vehicle and a validation data generator 130 that generates validation data for the sensor system from the data gathered at the vehicle and validation data provided from a master vehicle (not shown). The replica sensor system 120 is selected and positioned to emulate an optical path of a set of sensors associated with the master vehicle. In one implementation, the sensors on the master vehicle and the replica sensors 120 are implemented as stereovision camera systems. The replica sensor system 120 can include sensors that are of a same model or type as the sensors used on the master vehicle and can be positioned and oriented on the vehicle 110 in a manner imitative of the position and orientation of the sensor system on the master vehicle.

The replica sensor system 120 includes a sensor 122 and an alignment component 124 that adjusts a field of view of the sensor to match a field of view associated with the sensors that gathered the validation data on the master vehicle. The alignment component 124 can include one or more of a mechanical means for adjusting a position of the sensor 122 to simulate a field of view of the sensor on the master vehicle, an optical assembly that alters the field of view of the sensor 122 to simulate a field of view of the sensor on the master vehicle, and a digital image processor that adjusts the data collected by the sensor 122 to emulate collection of that data by the sensor on the master vehicle.

The validation data generator 130 generates a transfer function between the images taken at the new sensor system 111 to the images taken at the replica sensor system 120. It will be appreciated that, where the alignment component includes digital image processing or optical components, each of the sensor 122 and the sensor on the master vehicle will be configured to have a field of view that is larger than the region necessary for generating a transfer function. The validation data generator 130 can include a machine learning model 132 that is trained on the data captured at the new sensor system 111 and the replica sensor system 120. In one example, the machine learning model 132 can be implemented as an artificial neural network, such as a convolutional neural network, a recurrent neural network, a generalized adversarial network, or a variational autoencoder. The generated transfer function can then be applied to the validation data on the master vehicle by providing images from the validation data as inputs to the machine learning model 132 to generate validation data for the new vehicle 110.

Figure 2:
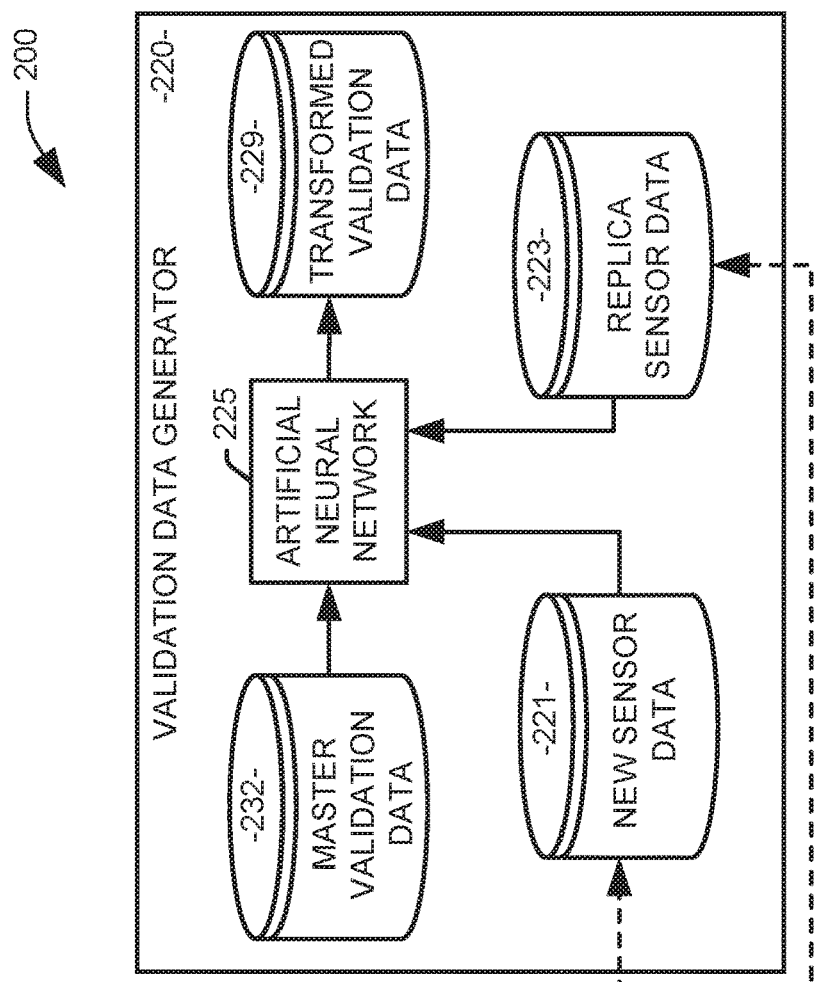
FIG. 2 illustrates another example of a system for providing validation data for an ADAS system.
Figure 2:
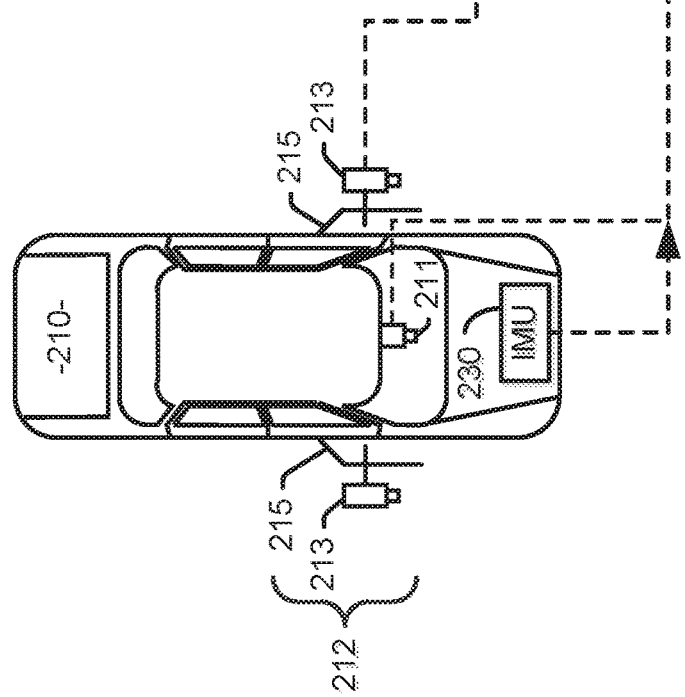

FIG. 2 illustrates another example of a system 200 for providing validation data for an ADAS system associated with the vehicle 210, and more specifically, for a sensor system 211 associated with the vehicle. In particular, a replica sensor system 212 is configured to mimic a sensor arrangement of a master vehicle, for which validation data has already been acquired, and the data from the replica sensor system is used to transform the data captured at the master vehicle for use with the sensor system 211. In the illustrated example, the replica sensor system 212 comprises a plurality of replica sensors 213 and 214 positioned on a frame 215 that is mounted to the vehicle 210 and configured to allow the replica sensors to be readily moved along three perpendicular axes. Accordingly, the replica sensors 213 and 214 system can be freely repositioned to emulate a position of the sensors from the master vehicle, for example, relative to a centerline of the vehicle, a calibration target, or another appropriate reference point.

The vehicle 210 can be driven with the sensor system 211 and the replica sensor system 212 in place for a distance that is less than the distance required to validate the sensor system 211 to produce a set of new sensor data 221 and replica sensor data 223 at a validation data generator 220. While the validation data generator 220 is shown as a set of functional blocks, it will be appreciated that, in practice, the validation data generator can be implemented as a computer system comprising a non-transitory memory and a processor, with the non-transitory memory to storing data and computer-executable instructions and the processor executing the computer-executable instructions to facilitate the performance of operations and/or implement the functions of one or more of components of the system. The validation data generator can be a general purpose computer, special purpose computer, and/or other programmable data processing apparatus. The non-transitory memory can be an electronic, magnetic, optical, electromagnetic, infrared, semiconductor system, apparatus or device, a portable computer diskette, a random access memory, a read-only memory; an erasable programmable read-only memory (or Flash memory), or a portable compact disc read-only memory. It will be appreciated that the validation data generator can incorporate multiple devices, with multiple processors and memories (not shown).

Since both sets of data 221 and 223 are collected simultaneously, it will be appreciated that the images comprising the new sensor data will have corresponding images in the set of replica sensor data that were captured at the same time. An artificial neural network 225 is trained on the new sensor data and the replica sensor data to provide an image transform function between the replica sensors and the new sensors. It will be appreciated that the image transform function may be provided explicitly as a mathematical expression, or implicitly in the form of the internal parameters, such as link weights between neurons, of the artificial neural network. In one example, images or video frames from the set of replica sensor data are provided as an input to the system with the corresponding images or frames from the new sensor data used as an exemplary output for the training process. In one example, the artificial neural network 225 is implemented as a convolutional neural network (CNN). A CNN is a type of artificial neural network that is generally not fully connected between layers, for example, a given input node may be connected to only a proper subset of the nodes in a hidden layer. This partial connection allows the CNN to learn various convolutional kernels that operate much like the kernels used in image filtering. These learned kernels effectively operate as the features for discriminating among classes, and as a result, the input into the CNN is generally the raw chromatic values for the pixels comprising the image.

It will be appreciated that various vehicles can have different dynamics during operation, due to differences both in the mechanical operation of the vehicle and, potentially, the route traveled by the vehicle during validation. To take this into account, the vehicle 210 can include a set of kinematic sensors, illustrated in FIG. 2 as an inertial measurement unit (IMU) 230, that generates data on vehicle dynamics while data is collected at the sensor system 211 and the replica sensor system 212. The master vehicle can be outfitted with a similar set of kinematic sensors when a set of master validation data 232 is obtained. Each of the master vehicle and the vehicle 210 can also be provided with a set of calibration targets (not shown) to facilitate comparison of the replica sensor data 223 to the master validation data 232. The data from the kinematic sensors can be used to learn a relation between master data 232 in the reference setup and replica data 213 on the new vehicle, for example, via a machine learning model (not shown), and compensate for inaccuracies of the replica data in the registration process. In one example, this is expressed as another image transfer function from the replica data 213 to the master validation data 232 that can be used to correct the replica data 213 for the differences in vehicle dynamics before training the artificial neural network 225.

Once the artificial neural network 225 is trained, images from the set of master validation data 232 can be provided to the artificial neural network to subject the master validation data 232 to the image transform function. The images output from the artificial neural network 225 in response to these images are then saved as a set of transformed validation data 234. This set of transformed validation data 234 can then be applied to validate the new sensor system 211 and any associated ADAS.

Figure 3:
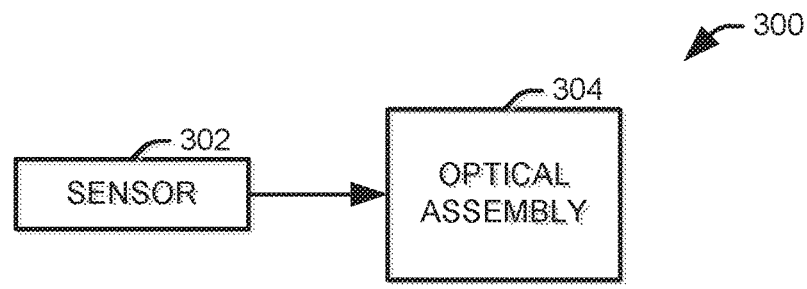
FIG. 3 illustrates one alternative implementation of the replica sensor system of FIG. 2.

FIG. 3 illustrates one alternative implementation 300 of the replica sensor system 212 of FIG. 2. The illustrated implementation 300 includes a sensor 302 and an optical assembly 304. The optical assembly 304 is selected and configured to adjust optical properties of the sensor 302 to match optical properties of a corresponding sensor on the master vehicle. In the illustrated example, the optical assembly 304 is selected to adjust a field of view of the sensor 302 to match a field of view of the corresponding sensor. Ideally, the fields of view of the sensor 302 and the corresponding sensor will be over-inclusive with respect to a portion of the field of view necessary to generate the image transfer function for the new sensor system. In one implementation, the new sensor system will have a smaller field of view compared to the master data, such that portions of the master data are sufficient to generate the new car training data. It will be appreciated that, where multiple sensors are used, for example, in a stereovision arrangement, each sensor can have a corresponding optical assembly to match the sensor (e.g., 302) to a corresponding sensor on the master vehicle.

Figure 4:
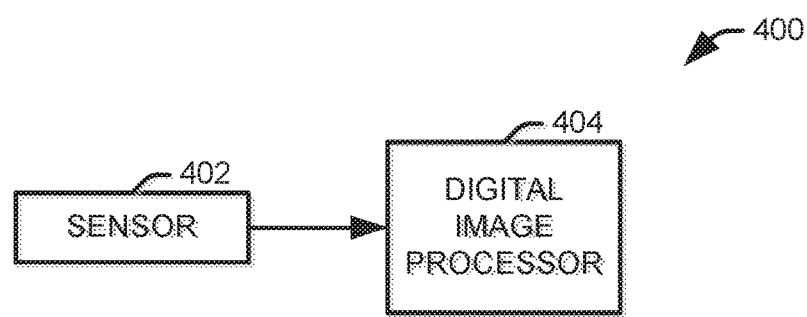
FIG. 4 illustrates one alternative implementation of the replica sensor system of FIG. 2.

FIG. 4 illustrates another alternative implementation 400 of the replica sensor system 212 of FIG. 2. The illustrated implementation 400 includes a sensor 402 and a digital image processor 404. The digital image processor 404 can be implemented, for example, as software instructions stored on a non-transitory computer readable medium and executed by an associated processor. The digital image processor 404 applies digital image transforms to image data collected at the sensor 402 to emulate the function of a corresponding sensor on the master vehicle. In the illustrated example, the digital image processor 404 adjusts a field of view of the sensor 402 to match a field of view of the corresponding sensor. As with the optical implementation 300, it is helpful if the fields of view of the sensor 402 and the corresponding sensor are over-inclusive with respect to a portion of the field of view necessary to generate the image transfer function for the new sensor system. In one implementation, the sensor 402 and the corresponding sensor can be selected such that the new sensor system will have a smaller field of view compared to the master data, such that portions of the master data are sufficient to generate the new car training data.

Figure 5:
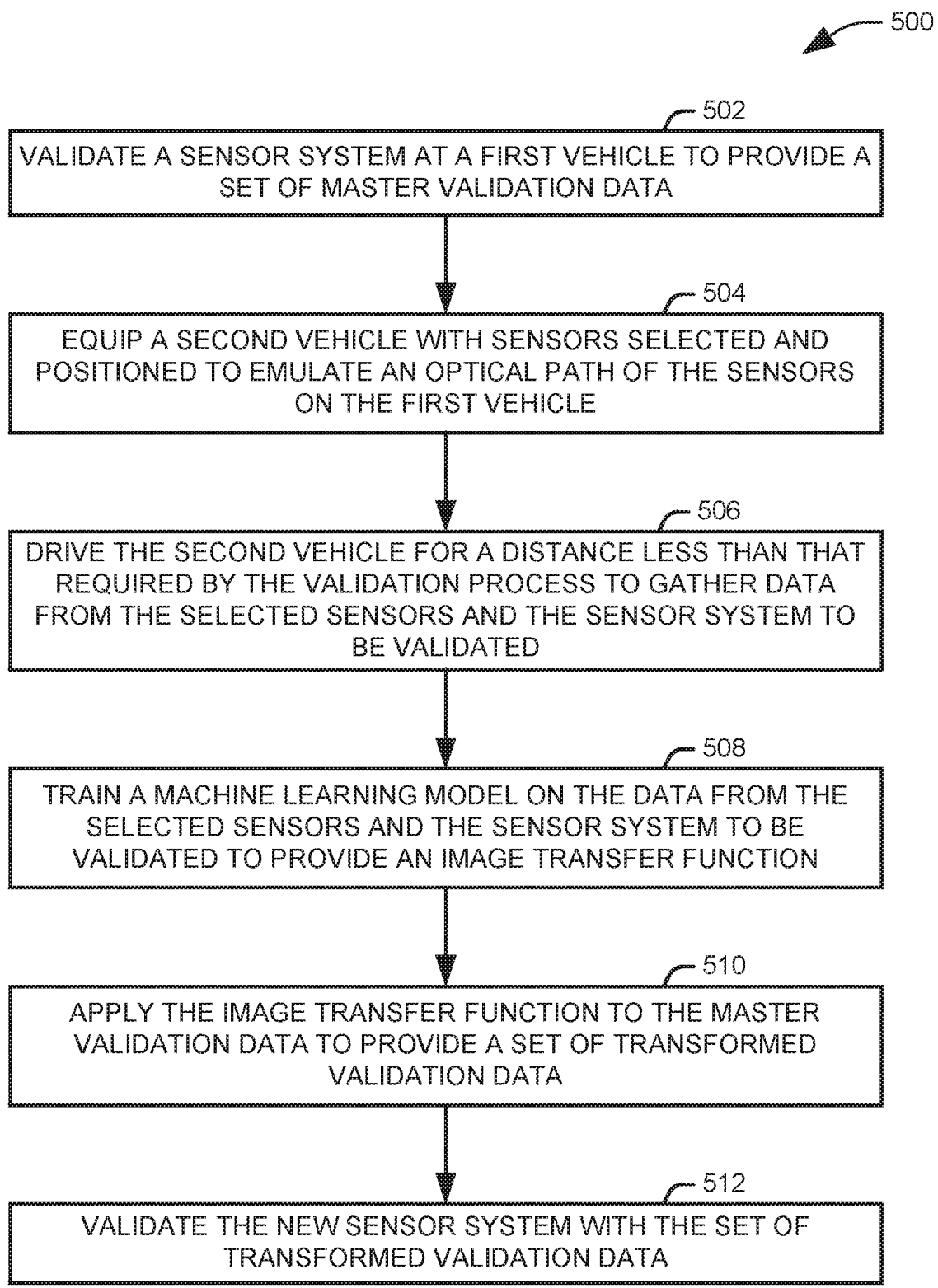
FIG. 5 illustrates a method for validating a sensor system associated with a vehicle.

Another aspect of the present disclosure can include a method for validating the performance of an advanced driver-assistance system, and more specifically, to validate the performance of a first set of sensors associated with a vehicle, as shown in FIG. 5. The method of FIG. 5 is illustrated as a process flow diagram with flowchart illustrations. For purposes of simplicity, the methods are shown and described as being executed serially; however, it is to be understood and appreciated that the methods in the present disclosure are not limited by the illustrated order as some steps could occur in different orders and/or concurrently with other steps shown and described herein. Moreover, not all illustrated aspects may be required to implement the methods.

One or more blocks of the flowchart illustration, and combinations of blocks in the block flowchart illustrations, can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

The methods can be implemented in hardware and/or in software (including firmware, resident software, microcode, etc.). Furthermore, aspects of the present disclosure may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain or store the program for use by or in connection with the instruction or execution of a system, apparatus, or device. As an example, executable code for performing the methods can be stored in a non-transitory memory of a computing device and executed by a processor of the computing device and/or another computing device.

At 502, a sensor system at a first vehicle, comprising a second set of at least one sensor, is validated to provide a set of master validation data. During this validation process, the first vehicle is driven, for example, by a human situated in the vehicle, a human operating the vehicle remotely, or via an automated system, for a required distance for the validation process. In one example, the required distance is one million kilometers. It will be appreciated that each of the second set of at least one sensor will be positioned on a known location of the vehicle. In one example, the second set of sensors includes a pair of stereo-vision cameras.

At 504, a second vehicle is equipped with a third set of sensors selected and positioned to emulate an optical path of the second set of sensors. The third set of sensors is selected to be substantially identical in function to the second set of sensors, and in one example, sensors of the same model are used for both vehicles. The third set of sensors are positioned and configured on the second vehicle in such a manner as to emulate the field of view of the second set of sensors on the first vehicle. For example, the third set of sensors can be positioned on the second vehicle at a same height as the second set of sensors, at a same position relative to a longitudinal center line of the vehicle as the second set of sensors, and at a same distance relative to a front of the vehicle as the second set of sensors.

Alternatively, one or more of the first set of sensors may be located on the second vehicle at a position suitable for use as a reference point for both vehicles, such as a rear view window, a position on the A-pillar, or at the roof line along the longitudinal centerline of the vehicle. In such a case, a coordinate system can be defined for each of the first and second vehicles, and the position of the second and third sets of sensors can be located at the same position within the coordinate frames associated with their respective vehicles. In one implementation, to facilitate positioning of the third set of sensors, the second vehicle can be fitted with a frame that holds the third set of sensors and allows the positions of the sensors to be adjusted. This adjustment can be performed using a calibration target to ensure that the sensors are positioned and oriented in a manner substantially identical to the second set of sensors.

In another example, the third set of sensors can include an optical assembly that alters the field of view of the third set of sensors to emulate the field of view of the second set of sensors during validation of the first vehicle. In a still further example, data from the third set of sensors can be provided to a digital image processor that alters the data received at the third set of sensors to emulate the field of view of the second set of sensors during validation of the first vehicle.

At 506, the second vehicle is driven for a distance that is less than the distance required for the validation process. In one implementation, a distance that is one-tenth the required distance is used, but it will be appreciated that this distance can vary with the implementation. During this time, data is collected at each of the first set of sensors and the third set of sensors. At 508, a machine learning system is trained to determine an image transfer function between the first set of sensors and the third set of sensors. In one implementation, a convolutional neural network can be trained using image frames from the third set of sensors as inputs and the corresponding frame or frames from the first set of sensors as an output. Accordingly, an explicit or implicit image transfer function can be determined to transform an image or images captured at the third set of sensors when the vehicle is at a given position to an image equivalent to the image or images that would be captured by the first set of sensors at the given position. To facilitate calculation of the image transform function, the second and third sets of sensors can be selected to have a field of view large enough that adjustment due to different positions of the cameras compared to the master data vehicle could be done by image data transformation.

In some implementations, the second vehicle may be configured to allow for dynamic calibration, by moving the sensor or the calibration target, to allow for adjustment of the distances between sensors of the third sets of sensors. Additionally, each of the first vehicle and the second vehicle can include respective sets of kinematic sensors that measure the dynamics of each vehicle as data is collected, specifically the master validation data and the data from the third set of sensors. This kinematic data can then be used to correct the data from the third set of sensors for the difference in dynamics between the two vehicles before training the machine learning model.

At 510, the determined image transform function is applied to the master validation data to provide a set of transformed validation data. It will be appreciated that, given the substantially identical nature and placement of the second set of sensors and the third set of sensors, the set of transformed validation data should represent the data that would have been gathered by the first set of sensors had the first set of sensors been present on the first vehicle during validation. At 512, the first set of sensors are validated using the set of transformed validation data.

Figure 6:
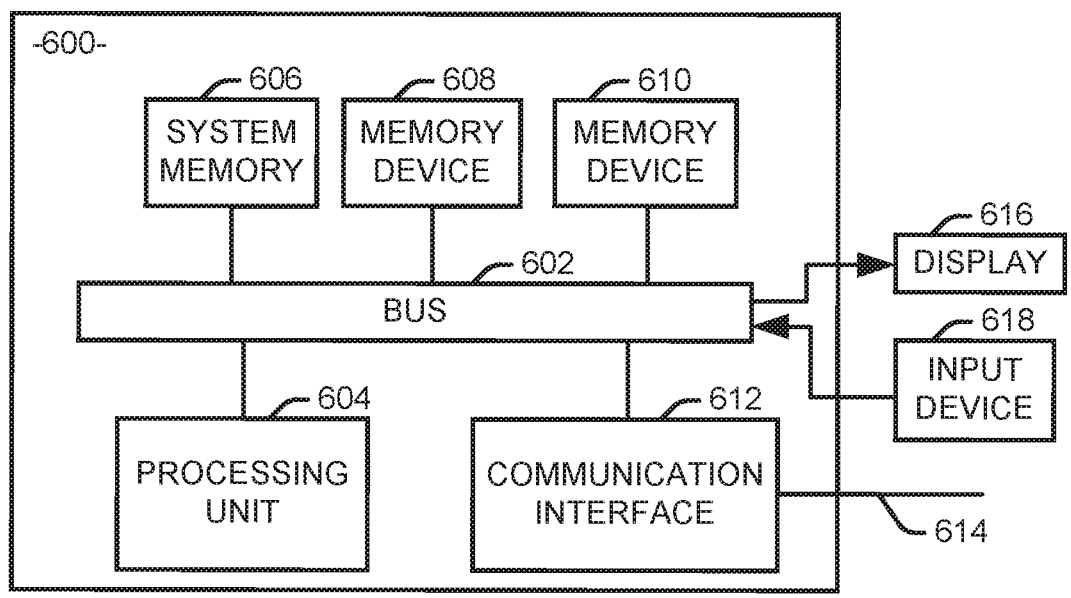
FIG. 6 is a schematic block diagram illustrating an exemplary system of hardware components capable of implementing examples of the system disclosed in FIGS. 1-5.

FIG. 6 is a schematic block diagram illustrating an exemplary system 600 of hardware components capable of implementing examples of the system disclosed in FIGS. 1-5, for example, the validation data generator 220 of FIG. 2. The system 600 can include various systems and subsystems. The system 600 can be a personal computer, a laptop computer, a workstation, a computer system, an appliance, an application-specific integrated circuit (ASIC), a server, a server blade center, a server farm, etc.

The system 600 can include a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 604 and the system memory 606. The additional memory devices 608 and 610, such as a hard disk drive, server, stand alone database, or other non-volatile memory, can also be in communication with the system bus 602. The system bus 602 interconnects the processing unit 604, the memory devices 606-610, the communication interface 612, the display 616, and the input device 618. In some examples, the system bus 602 also interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processing core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, disk drive, compact disk (CD), or server accessible over a network. In certain examples, the memories 606, 608 and 610 can comprise text, images, video, and/or audio, portions of which can be available in formats comprehensible to human beings.

Additionally or alternatively, the system 600 can access an external data source or query source through the communication interface 612, which can communicate with the system bus 602 and the communication link 614.

In operation, the system 600 can be used to implement one or more parts of a system or method for validating an advanced driver-assistance system in accordance with the present invention. Computer executable logic for implementing the validation system resides on one or more of the system memory 606, and the memory devices 608, 610 in accordance with certain examples. The processing unit 604 executes one or more computer executable instructions originating from the system memory 606 and the memory devices 608 and 610. The term "computer readable medium" as used herein refers to a medium that participates in providing instructions to the processing unit 604 for execution, and can, in practice, refer to multiple, operatively connected apparatuses for storing machine executable instructions.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on.

What is claimed is:

1. A system for validating a sensor system associated with a first vehicle comprising:
   the sensor system associated with the first vehicle;
   a replica sensor system mounted on the first vehicle and configured to emulate an optical path of a master sensor system associated with a second vehicle, the master sensor system having an associated set of validation data; and
   a validation data generator configured to generate a transfer function between a set of images taken at the sensor system associated with the first vehicle and a set of images taken at the replica sensor system and apply the transfer function to the set of validation data associated with the master sensor system to provide a set of validation data for the sensor system associated with the first vehicle, the transfer function comprising one of a mathematical expression and a set of internal parameters for an artificial neural network.

2. The system of claim 1, wherein the replica sensor system comprises:
a sensor; and
a frame mounted to the first vehicle and configured to allow the sensor to be translated along each of three perpendicular axes.

3. The system of claim 1, wherein the replica sensor system comprises:
a sensor; and
an optical assembly configured to adjust an optical property of the sensor to emulate an optical property of a corresponding sensor of the master sensor system.

4. The system of claim 1, wherein the replica sensor system comprises:
a sensor; and
a digital image processor configured to apply digital image transforms to image data collected at the sensor to emulate a field of view of a corresponding sensor of the master sensor system.

5. The system of claim 1, the transfer function comprising the set of internal parameters for the artificial neural network and the validation data generator comprising the artificial neural network which is trained on data collected at the sensor system associated with the first vehicle and the replica sensor system, the artificial neural network being configured to apply the transfer function to images from set of validation data associated with the master sensor system to provide the set of validation data for the sensor system associated with the first vehicle.

6. The system of claim 5, wherein the artificial neural network is a convolutional neural network.

7. The system of claim 1, further comprising a set of kinematic sensors that generates data on vehicle dynamics while data is collected at the replica sensor system, the validation data generator correcting the et of images taken at the replica sensor system according to the data on vehicle dynamics.

8. The system of claim 1, wherein each of a first field of view associated with the replica sensor system and a second field of view associated with the master sensor system are larger than a third field of view associated with the sensor system associated with the first vehicle.

9. A method for validating a sensor system associated with a vehicle comprising:
equipping the vehicle with a set of replica sensors selected and positioned to emulate an optical path of a master set of sensors, associated with a master vehicle, that has already been validated;
driving the vehicle for a distance less than that required for validation of the sensor system to acquire a first set of data associated with the set of replica sensors and a second set of data associated with the sensor system;
training an artificial neural network on the first set of data and the second set of data;
providing a set of master validation data produced during validation of the master vehicle to the artificial neural network to produce a set of transformed validation data;
and validating the new sensor system with the set of transformed validation data.

10. The method of claim 9, wherein driving the vehicle for a distance less than that required for validation of the sensor system comprises measuring data representing vehicle dynamics while driving the vehicle, the method further comprising correcting the first set of data according to the data representing vehicle dynamics.

11. The method of claim 9, wherein equipping the vehicle with a set of replica sensors selected and positioned to emulate the optical path of the master set of sensors comprises:
mounting a frame to the vehicle configured to translate along three perpendicular axes;
mounting sensor of the set of replica sensors on the frame; and
adjusting the frame to a position that emulates the optical path of the master set of sensors.

12. The method of claim 9, wherein equipping the vehicle with a set of replica sensors selected and positioned to emulate the optical path of the master set of sensors comprises equipping a sensor of the set of replica sensors with an optical assembly configured to adjust an optical property of the sensor of the set of replica sensors to match an optical property of a corresponding sensor of the master set of sensors.

13. The method of claim 9, further comprising a digital image processor that adjusts a field of view of each of a plurality of images comprising the first set of data to match a field of view of a set of images associated with the set of master validation data.

14. The method of claim 9, wherein training the artificial neural network on the first set of data and the second set of data comprises training a convolutional neural network on the first set of data and the second set of data.

15. A method for validating a sensor system associated with a vehicle comprising:
equipping the vehicle with a set of replica sensors selected and positioned to emulate an optical path of a master set of sensors, associated with a master vehicle, that has already been validated;
driving the vehicle for a distance less than that required for validation of the sensor system to acquire a first set of data associated with the set of replica sensors and a second set of data associated with the sensor system;
training a convolutional neural network on the first set of data and the second set of data;
providing each of a set of images comprising a set of master validation data to the convolutional neural network to produce a set of transformed images; and
validating the new sensor system with the set of transformed images.

16. The method of claim 15, wherein driving the vehicle for a distance less than that required for validation of the sensor system comprises measuring data representing vehicle dynamics while driving the vehicle, the method further comprising correcting the first set of data according to the data representing vehicle dynamics.

17. The method of claim 15, wherein equipping the vehicle with a set of replica sensors selected and positioned to emulate the optical path of the master set of sensors comprises:
mounting a frame to the vehicle configured to translate along three perpendicular axes;
mounting sensor of the set of replica sensors on the frame; and
adjusting the frame to a position that emulates the optical path of the master set of sensors.

18. The method of claim 15, wherein equipping the vehicle with a set of replica sensors selected and positioned to emulate the optical path of the master set of sensors comprises equipping a sensor of the set of replica sensors with an optical assembly configured to adjust an optical property of the sensor of the set of replica sensors to match an optical property of a corresponding sensor of the master set of sensors.

19. The method of claim 15, further comprising a digital image processor that adjusts a field of view of each of a plurality of images comprising the first set of data to match a field of view of a set of images associated with the set of master validation data.

* * * * *